United States Patent
Plow et al.

(10) Patent No.: US 9,292,484 B1
(45) Date of Patent: Mar. 22, 2016

(54) METHOD AND SYSTEM FOR AUTOMATICALLY PROVIDING INFORMATION TO AN ELECTRONIC FORM

(75) Inventors: Gregory Maurice Plow, Gilroy, CA (US); Farrokh E. Pourmirzaie, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 219 days.

(21) Appl. No.: 09/538,032

(22) Filed: Mar. 29, 2000

(51) Int. Cl.
*G06F 17/00* (2006.01)
*G06F 17/24* (2006.01)

(52) U.S. Cl.
CPC .................................. *G06F 17/243* (2013.01)

(58) Field of Classification Search
CPC ................................................... G06F 17/243
USPC .......... 715/507, 224, 225, 226, 508; 717/115, 717/507, 508
See application file for complete search history.

(56) References Cited

U.S. PATENT DOCUMENTS

| | | | | |
|---|---|---|---|---|
| 5,794,259 A * | 8/1998 | Kikinis | .......................... | 715/207 |
| 5,872,640 A * | 2/1999 | Cohen et al. | ................... | 358/434 |
| 6,026,187 A * | 2/2000 | Siegel | ............................ | 382/213 |
| 6,192,380 B1 * | 2/2001 | Light et al. | ..................... | 715/505 |
| 6,421,693 B1 * | 7/2002 | Nishiyama et al. | ............ | 715/507 |
| 6,460,042 B1 * | 10/2002 | Hitchcock et al. | .............. | 707/10 |
| 6,490,601 B1 * | 12/2002 | Markus et al. | ................. | 715/507 |
| 6,499,042 B1 * | 12/2002 | Markus | ........................... | 715/507 |
| 6,589,290 B1 * | 7/2003 | Maxwell et al. | .............. | 715/507 |
| 6,651,217 B1 * | 11/2003 | Kennedy et al. | .............. | 715/507 |
| 6,854,085 B1 * | 2/2005 | Morse | ............................. | 715/507 |
| 6,910,179 B1 * | 6/2005 | Pennell et al. | ................. | 715/207 |
| 7,216,292 B1 * | 5/2007 | Snapper et al. | ................ | 715/236 |
| 2002/0013788 A1 * | 1/2002 | Pennell et al. | ................ | 707/507 |
| 2004/0243520 A1 * | 12/2004 | Bishop et al. | ................... | 705/75 |

OTHER PUBLICATIONS

Frank Chang, Tailoring AutoComplete for Your Site, Microsoft Corporation, Mar. 10, 1999, pp. 1-2.*
Frank Chang, Tailoring Autocomplete for Your Site, Mar. 10, 1999, Microsoft Corporation, pp. 1-2.*
Rajagopalun, Preventing Autocomplete Function, Google Groups Discussion Board, Dec. 28, 1999.*
"Novell Previews digitalme(TM): Directory-Enabled Technology for Personal Control of Identity on the Internet", PR News Wire, Mar. 22, 1999, Salt Lake City, BrainShare(R).
Nguyen, Bq, "Enable Storing Partially Completed Forms on the World Wide Web", Nov. 1995.

(Continued)

*Primary Examiner* — Stephen Hong
*Assistant Examiner* — Matthew Ludwig
(74) *Attorney, Agent, or Firm* — Sawyer Law Group, P.C.

(57) ABSTRACT

A method and system for automatically providing information to an electronic form is disclosed. The method comprises accessing an electronic form wherein the electronic form utilizes at least one designated programming language tag and automatically providing information from a profile to the electronic form. Through the use of a method and system in accordance with the present invention, a user will have the ability to automatically fill in electronic forms based on information in an autofill profile. The autofill profile information is utilized potentially thousands of times. This reuse of information, in place of manual typing, will save hours of time and users will be greatly appreciative of all systems offering this advanced facility.

33 Claims, 8 Drawing Sheets

(56) References Cited

OTHER PUBLICATIONS

Lynch, Jim, IE5: The Final Cut (Microsoft Internet Explorer 5.0), P.C. Magazine, Apr. 20, 1999.

Bonner, Paul, "Promising a Brave New World. (Oberon Software's Prospero Version 1.1. Application Development Software)", Sep. 1996.

* cited by examiner

10

*Name Mr.▽
Title ～12
*Company ～14
*Address ～16
Address 2
*City  *St/Prov  *Zip/Postal Code
Country
*Phone
FAX
*Email

FIG. 1
(PRIOR ART)

```
...
<tr>
  <td align="right">* Name</td>
  <td></td>
  <td><select name="Salutation" size="1">
        <option>Mr.</option>
        <option>Mrs.</option>
        <option>Ms.</option>
      </select> 
      <input type="text" size="43" name="Name"></td>
</tr>
<tr>
  <td align="right">Title</td>
  <td></td>
  <td><input type="text" size="50" name="Title"></td>
</tr>                    ⎣₂₂
<tr>
  <td align="right"></td>
  <td></td>
  <td></td>
</tr>
<tr>
  <td align="right">* Company</td>
  <td></td>
  <td><input type="text" size="50" name="Company"></td>
</tr>                    ⎣₂₄
<tr>
  <td align="right">* Address</td>
  <td></td>
  <td><input type="text" size="50" name="Address"></td>
</tr>                    ⎣₂₆
<tr>
  <td align="right">Address 2</td>
  <td></td>
  <td><input type="text" size="50" name="Address_b"></td>
</tr>
...
```

METHOD AND SYSTEM FOR AUTOMATICALLY PROVIDING INFORMATION TO AN ELECTRONIC FORM

FIELD OF THE INVENTION

The present invention relates generally to the use of electronic forms and specifically to the implementation of a method and system for automatically providing information to an electronic form.

BACKGROUND OF THE INVENTION

Utilization of the Internet for ordering products, subscriptions to e-zines, opening accounts, etc., has become immensely popular for people all over the world. This popularity is due, in great measure, to the tremendous productivity and efficiency improvements afforded by electronic processes over the paper application process. Users employ web browsers to "surf" the Internet and find web sites of interest. A web browser uses HTTP—the HyperText Transfer Protocol to communicate over the Internet, while HyperText Markup Language (HTML) is used to create web pages on the Internet and present users with electronic forms (e-form).

However, a very inefficient and irritating process remains in this new electronic world that is not addressed properly by current technology. Every time a user is requested to supply information on the Internet or on commercial software application programs, she is either forced to manually type in all applicable portions of the electronic form (e-form) or she is forced to compromise privacy, security and efficiency, by giving up the control of her personal information. FIG. 1 represents a typical e-form 10 and various input fields 12, 14, 16 needing to be manually entered by a user.

Typically, a web designer creates the input fields 12, 14, 16 on an e-form with HTML statements like:
<INPUT TYPE=SIZE=NAME=>
A statement such as this is interpreted by the browser to be an input field that needs to be filled in by the user. FIG. 2 represents the HTML statements 22, 24, 26 utilized to create the corresponding input fields 12, 14, 16 of FIG. 1.

More and more web sites require users to fill out e-forms in order to download trial programs, access information, subscribe to some service or order a product. This is not surprising in that web sites are frequently utilized to obtain information from potential customers visiting their site. Frequently web sites are designed to provide something of value, but only if information about the customer is collected.

This results in a great deal of wasted time and inconvenience as users have to repeatedly enter their names, addresses, phone numbers, fax numbers, e-mail addresses, zip codes, income, age, credit card, etc. Not only is this wasteful of the users time, but it is also harmful to businesses because many times the user will elect to leave a web site because of the irritation of continually having to retype this same information over and over again.

Existing solutions to this problem do not provide complete privacy, security and efficiency. For example, some conventional implementations require a user to give up a portion of his display screen to be used by an additional toolbar.

Second, the personal information which is entered by the user, is transmitted over the network to a web site and stored in their respective servers. This personal information is subjected to misuse by a third party. The users are asked to simply trust the web site in the collection, use and disclosure of their personal information.

Third, conventional implementations are interpretive and inaccurate. For example, eCode.Com tries to fill-in the forms by matching the "NAME=" attribute of the INPUT HTML tag associated with an input field with the personal information previously stored in their servers. If an e-form uses the "NAME=" attribute with any fieldname that eCode.Com does not recognize, the field does not get filled in. For example, if an e-form uses the HTML statement <INPUT TYPE="text" SIZE="50" NAME="firstname">, eCode.Com's AutoFill will not be able to recognize that the NAME="firstname" is a field name for the user's first name. The field associated with this INPUT tag will be left blank because eCode.Com's AutoFill was expecting NAME="Name" for the user's name field instead.

Finally, conventional implementations only fill in a limited number of input fields in e-forms because they are limited by the personal information that they ask the users to provide during set up. Although this personal information can be modified by the user, no new personal information can be added to the personal information already stored.

Accordingly, what is needed is a system and method for automatically completing e-forms without compromising users' privacy, security and efficiency concerns. The present invention addresses such a need.

SUMMARY OF THE INVENTION

A method and system for automatically providing information to an electronic form is disclosed. The method comprises accessing an electronic form wherein the electronic form utilizes at least one designated programming language tag and automatically providing information from a profile to the electronic form.

Through the use of a method and system in accordance with the present invention, a user will have the ability to automatically fill in electronic forms based on information in an autofill profile. The autofill profile information is utilized potentially thousands of times. This reuse of information, in place of manual typing, will save hours of time and users will be greatly appreciative of all systems offering this advanced facility.

BRIEF DESCRIPTION OF THE DRAWINGS

FIG. 1 is an illustration of a typical web site e-form.

FIG. 2 represents the HTML statements used to generate the e-form of FIG. 1.

FIG. 6 represents another aspect of the method and system in accordance with the present invention.

DETAILED DESCRIPTION

The present invention relates to method and system for providing information to an electronic form. The following description is presented to enable one of ordinary skill in the art to make and use the invention and is provided in the context of a patent application and its requirements. Although the present invention has been described in the context of being used with the Internet, one of ordinary skill in the art will readily recognize that the present system can be used in conjunction with any type of networking system while remaining within the spirit and scope of the present invention. Accordingly, various modifications to the preferred embodiment will be readily apparent to those skilled in the art and the generic principles herein may be applied to other embodiments. Thus, the present invention is not intended to be limited to the embodiments shown but is to be accorded the widest scope consistent with the principles and features described herein.

Figure 3:
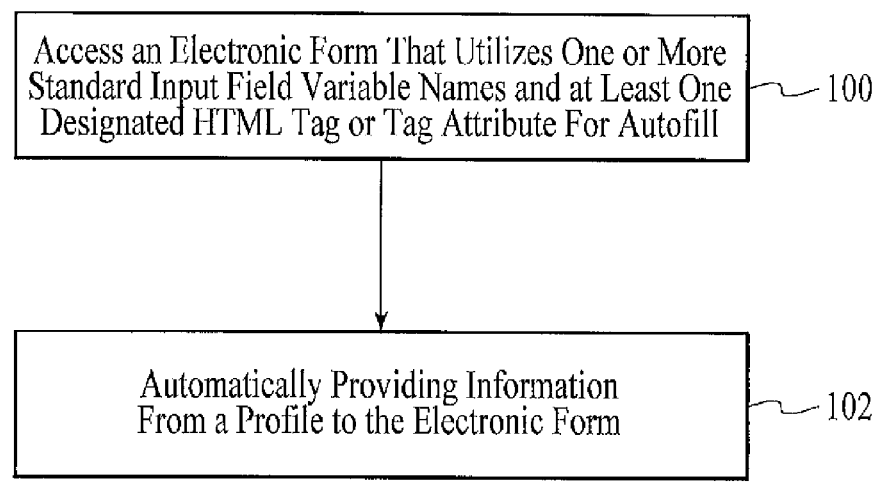
FIG. 3 is a high-level flowchart of a method in accordance with the present invention.

To more particularly describe the method and system in accordance with the present invention, FIG. 3 is a high-level flowchart of a method in accordance with the present invention. First, an e-form utilizing one or more standard input field variable names and at least one designated HTML tag or tag attribute for autofill is accessed, via step 100. Next, information is automatically provided from a profile to the e-form, via step 102. Through the use of a method and system in accordance with the present invention, a user will have the ability to automatically fill in electronic forms based on information in an autofill profile stored in the user's personal computer or internet connected hand held device. The autofill profile information is utilized potentially thousands of times. This reuse of information, in place of manual typing, will save hours of time and the users will be greatly appreciative of all systems offering this advanced facility.

Figure 4:
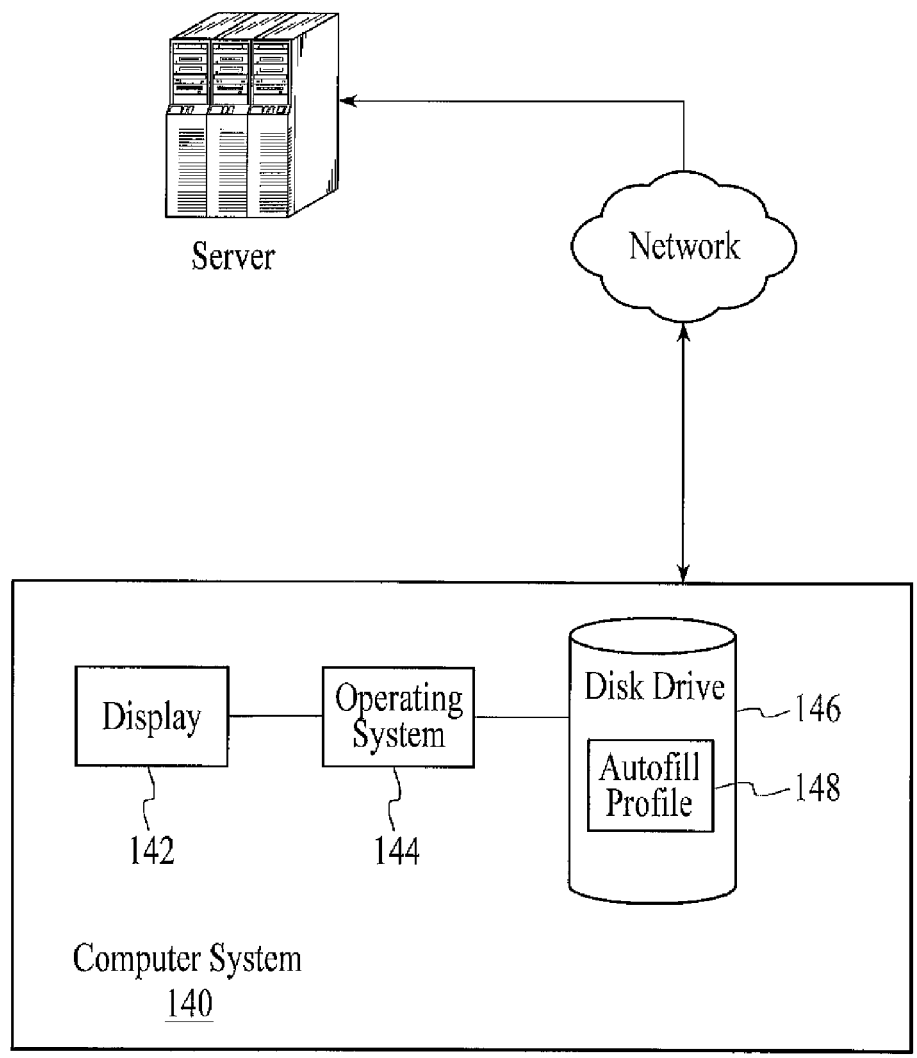
FIG. 4 illustrates the preferred embodiment of a system in accordance with the present invention.

The method and system in accordance with the present invention is described in the context of a preferred embodiment. The preferred embodiment allows a user to optionally create an "autofill" profile to be stored at his personal computer for future use in the completion of e-forms. The "autofill" profile can be created/edited directly by use of an editing means or through the user's internet browser. Internet browsers could accommodate this through their Edit Preferences facilities. Preferably the "autofill" profile will be kept in a secure user-file and made available to any e-form application when desired. FIG. 4 is an illustration of a system in accordance with the present invention. The system comprises a computer system 140 that includes an operating system 144 and a display 142. The autofill profile 148 may be stored in the computer systems disk drive 146.

The autofill profile (e.g., myautofill.pro) contains information about a particular user. The information is organized as a set of input field variable name-value pairs. The types of information most likely to be utilized would be the user's name, address, telephone, fax, e-mail address, shipping address, income, age, credit card number, expiration date, etc. The user may complete as much or as little of the autofill profile as the user wishes. Completed fields in the autofill profile allow information to be automatically transferred to any e-form associated with an application that chooses to practice this invention. Fields that the user chooses to leave blank in the autofill profile will likewise remain blank if that corresponding information is requested on an "autofill" style e-form. There is no limit to the amount or type of information that could conceivably have value in the autofill profile.

Each piece of information entered into this profile is a name-value pair information object. The field name is followed by a value. The field names are standardized and must appear in the NAME=attribute of the INPUT tag. For example, the user's first name is defined by the field name fname. Likewise, we could define mname and lname for the user's middle name and last name, respectively. Field Names such as haddr1, haddr2, hcity, hstate can also be defined to represent the corresponding information objects pertaining to the user's address. These newly defined field names would be formal names and documented in HTML documents where they discuss the autofill concept. Based on these standard field names, programmers can create "autofill" style e-forms.

| A Sample Autofill Profile (myautofill.pro) | | |
|---|---|---|
| Input Field Name | Input Field Value | Input Field Description |
| fname | John | first name |
| mname | M | middle name/initial |
| lname | Thompson | last name |
| ntitle | Mr. | name title |
| gender | Male | gender/sex |
| age | 50 | age |
| haddr1 | 123 Sky Way | home street address |
| haddr2 | #456 | home apt# |
| hcity | New York | home city |
| hstate | NY | home state |
| hzip | 12345 | home zipcode |
| baddr1 | One IBM Way | business street address |
| baddr2 | Suite #1000 | business suite# |
| bcity | New York | business city |
| bstate | NY | business state |
| bzip | 678901 | business zip |
| hphone | (926) 555-1212 | home phone# |
| bphone | (714) 555-1212 | business phone# |
| hfax | | home fax# |
| bfax | | business fax# |
| email | JMT@IBM.COM | email address |

As previously stated, programmers create e-form input fields with an HTML statement like:

<INPUT TYPE=SIZE=NAME=>

A statement such as this is interpreted by the browser to be an input field that needs to be filled in by the user. However, utilizing the method and system in accordance with the present invention, the current HTML syntax is extended to include the new attribute "AUTOFILL", for the INPUT tag. By incorporating the AUTOFILL="Yes" attribute in the INPUT tag, the e-form application automatically retrieves the requested information from the user's previously created autofill profile (e.g. myautofill.pro) and displays it in the designated input fields of the e-form. Any fields not automatically filled in, or fields filled in but in need of correction, can be further edited by the user utilizing current methods prior to submitting the e-form.

Programmers may thus create autofill e-forms by generating HTML statements such as:

<INPUT TYPE="text" SIZE="30" NAME="fname" AUTOFILL="Yes">
<INPUT TYPE="text" SIZE="30" NAME="lname" AUTOFILL="Yes">

Based on these HTML statements, the input field names "fname" and "lname" are associated with the field names in an autofill profile. Consequently, once the e-form is accessed, the browser automatically retrieves the corresponding field values from the user's autofill profile and displays the user's first name and the user's last name on the designated e-form fields, if such information was provided in the creation of the autofill profile.

Figure 5:
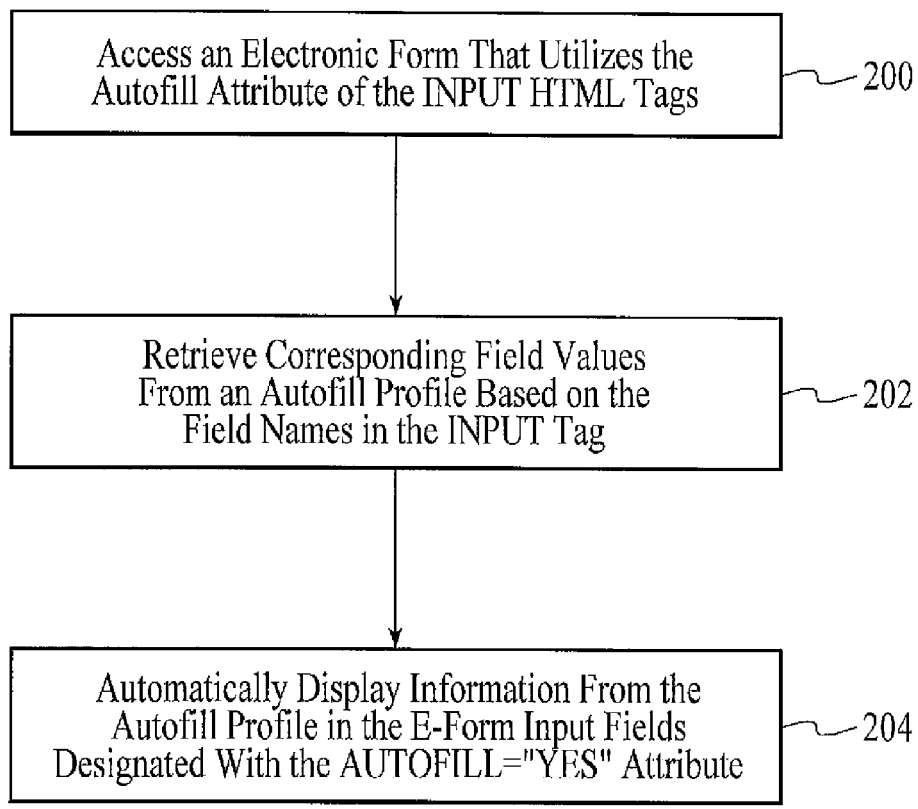
FIG. 5 is a flowchart of the operation of the preferred embodiment of the method in accordance with the present invention.

Please refer to FIG. 5 for an example of the operation of a method in accordance with the present invention. First, an e-form utilizing the AUTOFILL attribute of the INPUT HTML tag is accessed, via step 200. Next, the field values corresponding to the field names in the INPUT tag are retrieved from an autofill profile, via step 202. Finally, information from the autofill profile is automatically displayed in the e-form input fields designated with the AUTOFILL="Yes" attribute, via step 204. Notice that the VALUE attribute of the INPUT tag (if present) is overridden by the value from autofill profile (if present).

Although the preferred embodiment of the method and system in accordance with the present invention introduces the AUTOFILL attribute and suggests standardization of the input field names, one of ordinary skill in the art will readily recognize that a variety of alternative implementations (including use of other HTML and XML tags) could be utilized while remaining within the spirit and scope of the present invention. For example, instead of the AUTOFILL attribute for the INPUT tag, one could implement AUTOFILL tag to embrace the FORM tag.

Figure 6:
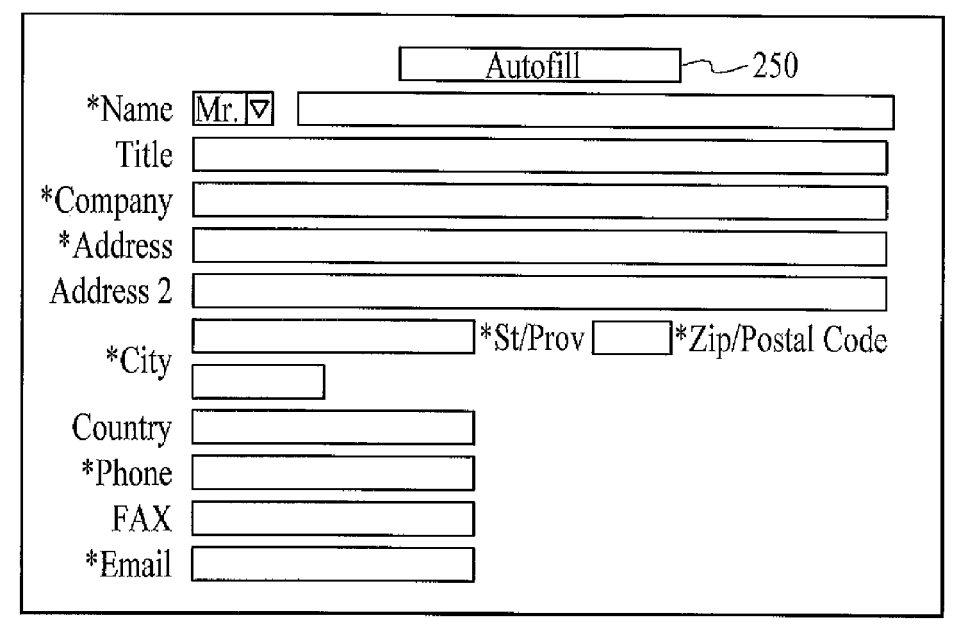

This invention may be further enhanced by offering an increased level of privacy for the user. Various unscrupulous businesses, upon learning of this stored autofill profile information, could capture this information and return it to their server without the user's permission or knowledge. To preclude or minimize this type of privacy breach, the autofill profile is stored encrypted and later decrypted during processing. For example, the autofill style e-form could contain an "autofill button" within the e-form which, upon inspection and approval of the form, the user could choose to click to initiate the automatic completion of the e-form, or the browser could display a dialog window upon detection of autofill enabled e-form and request the user's okay before proceeding with the autofill. FIG. 6 represents an e-form incorporating an autofill button 250. Preferably, upon mouse-clicking the button 250, a dialog box appears and requests the user to enter a password. This password serves as the encryption key necessary to decrypt the stored autofill profile information. If the user enters the correct password, the autofill profile information is decrypted and the autofill profile can be utilized as necessary to complete the autofill e-form. Without specification of this password, the unscrupulous hacker would only be able to retrieve worthless encrypted information from the autofill profile. Implementation of this aspect of the invention will also ensure that the autofill profile information is provided only if the user wants it to be. Other means may be utilized to provide added security and privacy.

Figure 7:
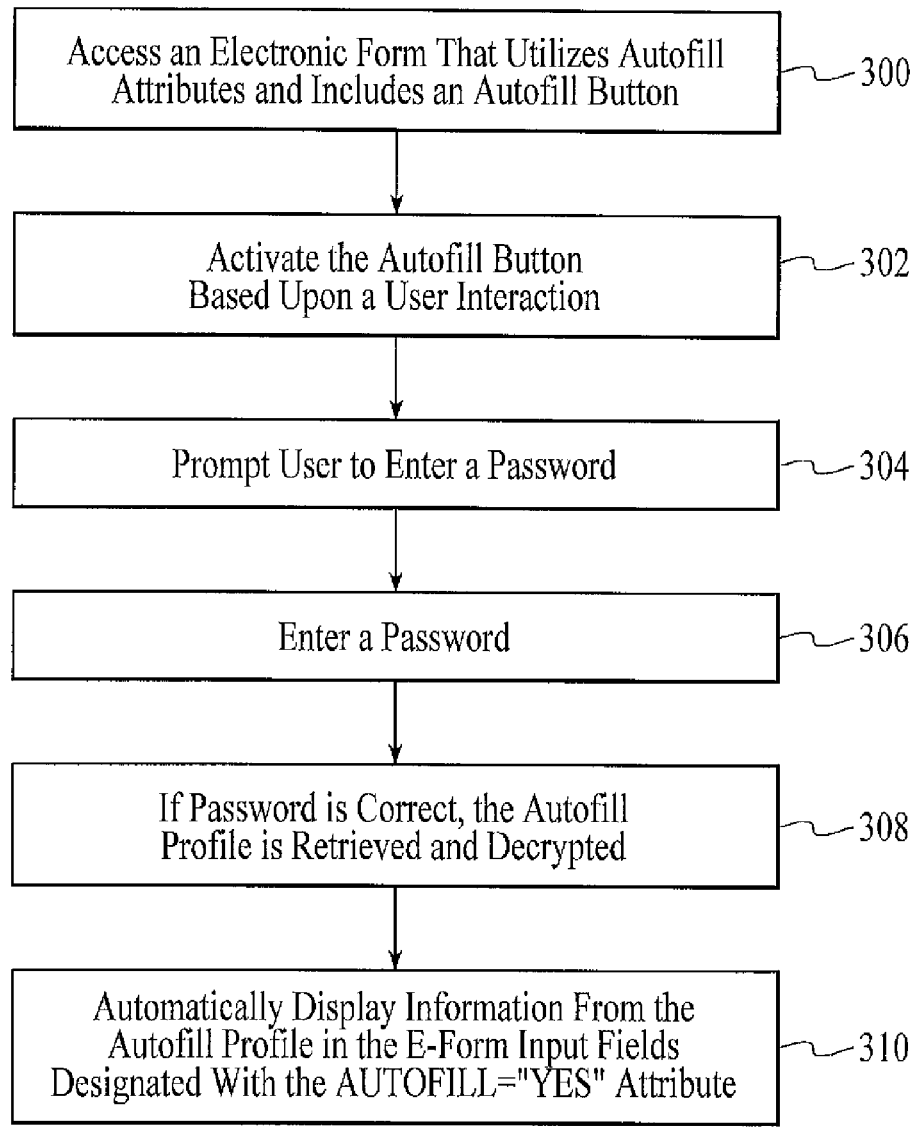
FIG. 7 is a flowchart of another aspect of the method in accordance with the present invention.

Please refer to the flowchart of FIG. 7 for an example of the operation of this aspect of the invention. First, an e-form utilizing AUTOFILL attribute and including an autofill button is accessed, via step 300. Next, the autofill button is activated based upon a user interaction, via step 302. Preferably this is done with a conventional mouse-click. The user is then prompted to enter a password, via step 304. Presuming the correct password is entered, via step 306, the autofill profile is then retrieved and decrypted, via step 308. Finally, information from the autofill profile is displayed in all corresponding e-form input fields designated with an appropriate AUTOFILL="Yes" attribute tag, via step 310.

Another embodiment of the method and system in accordance with the present invention relates to its applicability to other commercial software application programs. Many commercial software application programs (Quicken, TurboTax, Adobe Acrobat® etc.) also employ the use of electronic forms that require the user to manually enter information. Consequently, a slightly different implementation of the present invention, but with the same functional result, is contemplated. In this embodiment, when the e-form is accessed, an application program interface (API) provided by the operating system will be invoked to attempt to access an autofill profile. If the autofill profile exits, the resulting API invocation automatically retrieves the requested information from the autofill profile and displays it in the designated input fields of the e-form. Notice that the software application should utilize the standard input field names in order to retrieve correct information. Once the information is displayed, it can be further edited by the user if necessary.

Figure 8:
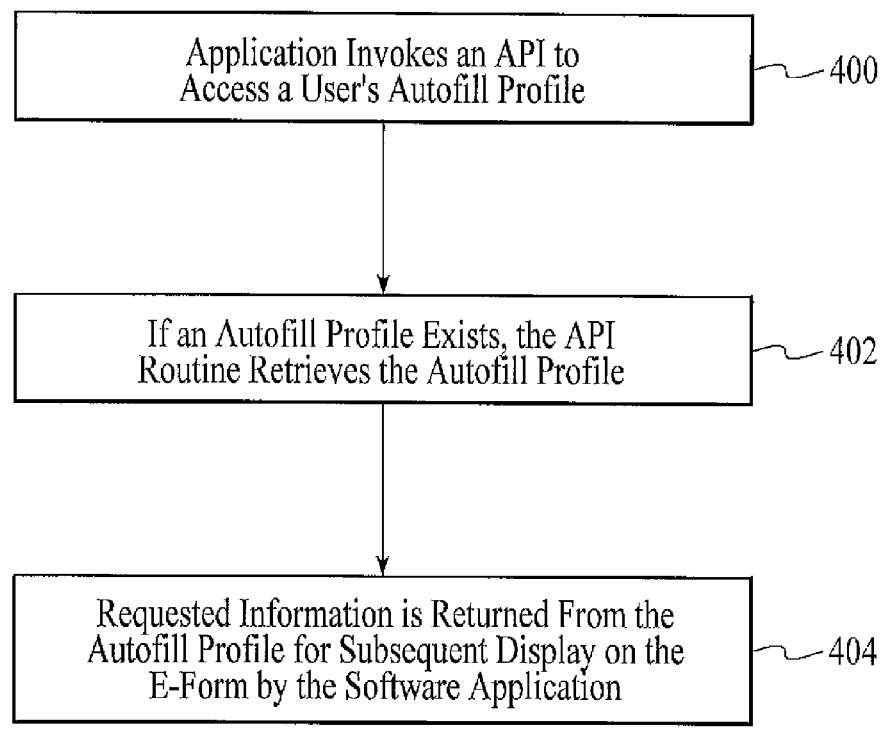
FIG. 8 is a flowchart of another embodiment of the method in accordance with the present invention.

For an example of the operation of this embodiment of the method in accordance with the present invention, please refer to the flowchart of FIG. 8. First, during the installation of the software application program, an API is invoked by the software application program to access an autofill profile, via step 400. If there exists an autofill profile, it is retrieved by the API, via step 402. Finally, information from the autofill profile is displayed in any relevant e-form input fields of the software application program, via step 404.

It is anticipated that commercial software developers and web designers that employ the use of electronic forms will implement autofill-type programming language in order to prevent potential customers from wasting time filling out long and tedious e-form applications and questionnaires. The autofill profile information can be utilized potentially thousands of times. This reuse of information, in place of manual typing, will save hours of time and the users will be greatly appreciative of businesses offering this advanced facility. Businesses will practice this invention to make it fast and simple for any user, customer or potential new customer to provide the needed information.

Although the present invention has been described in accordance with the embodiments shown, one of ordinary skill in the art will readily recognize that there could be variations to the embodiments and those variations would be within the spirit and scope of the present invention. Accordingly, many modifications may be made by one or ordinary skill in the art without departing from the spirit and scope of the appended claims.

What is claimed is:

1. A computer-implemented method comprising: in response to a determination that an input field within an electronic form is autofill-enabled, automatically filling in the input field based on information in an autofill profile, wherein the input field is associated with an input tag having an autofill attribute and a name attribute, wherein the input field is determined to be autofill-enabled if the autofill attribute having an autofill attribute value indicating an enablement, wherein the name attribute having a standardized name attribute value utilized by a plurality of electronic forms, wherein the information in the autofill profile is organized as a set of input field variable name-value pair entries, and wherein the standardized name attribute value is used as an input field variable name to retrieve the information from the autofill profile.

2. The computer-implemented method of claim 1 wherein the electronic form utilizes HyperText Markup Language (HTML).

3. The computer-implemented method of claim 1 wherein the electronic form utilizes Extended Markup Language (XML).

4. The computer-implemented method of claim 1 wherein the electronic form comprises a plurality of fields.

5. The computer-implemented method of claim 1 wherein the autofill profile resides in memory local to a user's computer.

6. The computer-implemented method of claim 1 wherein the autofill profile is retrieved by a web browser.

7. The computer-implemented method of claim 1 wherein the autofill profile is retrieved by an operating system.

8. The computer-implemented method of claim 1 wherein the autofill profile is encrypted.

9. The computer-implemented method of claim 8 further comprising:
   decrypting the autofill profile using an encryption key.

10. The computer-implemented method of claim 1 wherein the field is determined to be autofill-enabled if it is associated with an AUTOFILL="Yes" attribute.

11. The computer-implemented method of claim 1 wherein the field is determined to be autofill-enabled if a form tag is embraced by an autofill tag.

12. A computing system comprising:
   a computer processor coupled to a computer-readable memory unit, the memory unit including instructions that, when executed by the computer processor, implement a method comprising:
   in response to a determination that an input field within an electronic form is autofill-enabled, automatically filling in the input field based on information in an autofill profile, wherein the input field is associated with an input tag having an autofill attribute and a name attribute,
   wherein the input field is determined to be autofill-enabled if the autofill attribute having an autofill attribute value indicating an enablement,
   wherein the name attribute having a standardized name attribute value utilized by a plurality of electronic forms,
   wherein the information in the autofill profile is organized as a set of input field variable name-value pair entries, and wherein the standardized name attribute value is used as an input field variable name to retrieve the information from the autofill profile.

13. The computing system of claim 12 wherein the electronic form utilizes HyperText Markup Language (HTML).

14. The computing system of claim 12 wherein the electronic form utilizes Extended Markup Language (XML).

15. The computing system of claim 12 wherein the electronic form comprises a plurality of fields.

16. The computing system of claim 12 wherein the autofill profile resides in said computer-readable memory unit.

17. The computing system of claim 12 wherein the autofill profile is retrieved by a web browser.

18. The computing system of claim 12 wherein the autofill profile is retrieved by an operating system.

19. The computing system of claim 12 wherein the autofill profile is encrypted.

20. The computing system of claim 19 wherein said method implemented by said instructions included in said memory unit further comprises:
   decrypting the autofill profile using an encryption key.

21. The computing system of claim 12 wherein the field is determined to be autofill-enabled if it is associated with an AUTOFILL="Yes" attribute.

22. The computing system of claim 12 wherein the field is determined to be autofill-enabled if a form tag is embraced by an autofill tag.

23. A non-transitory computer readable storage medium containing program instructions for automatically providing information to a field within an electronic form, the program instructions which when executed by a computer system cause the computer system to execute a method comprising:
   in response to a determination that an input field within an electronic form is autofill-enabled, automatically filling in the input field based on information in an autofill profile, wherein the input field is associated with an input tag having an autofill attribute and a name attribute,
   wherein the input field is determined to be autofill-enabled if the autofill attribute having an autofill attribute value indicating an enablement,
   wherein the name attribute having a standardized name attribute value utilized by a plurality of electronic forms,
   wherein the information in the autofill profile is organized as a set of input field variable name-value pair entries, and
   wherein the standardized name attribute value is used as an input field variable name to retrieve the information from the autofill profile.

24. The computer readable storage medium of claim 23 wherein the electronic form utilizes HyperText Markup Language (HTML).

25. The computer readable storage medium of claim 23 wherein the electronic form utilizes Extended Markup Language (XML).

26. The computer readable storage medium of claim 23 wherein the electronic form comprises a plurality of fields.

27. The computer readable storage medium of claim 23 wherein the autofill profile resides in memory local to a user's computer.

28. The computer readable storage medium of claim 23 wherein the autofill profile is retrieved by a web browser.

29. The computer readable storage medium of claim 23 wherein the autofill profile is retrieved by an operating system.

30. The computer readable storage medium of claim 23 wherein the autofill profile is encrypted.

31. The computer readable storage medium of claim 30 further comprising:
   decrypting the autofill profile using an encryption key.

32. The computer readable storage medium of claim 23 wherein the field is determined to be autofill-enabled if it is associated with an AUTOFILL="Yes" attribute.

33. The computer readable storage medium of claim 23 wherein the field is determined to be autofill-enabled if a form tag is embraced by an autofill tag.

* * * * *